Oct. 28, 1958  R. F. JOHNSTON  2,858,536
TYPE ACTUATING MEANS IN HIGH SPEED PRINTERS
Filed May 4, 1955  6 Sheets-Sheet 1
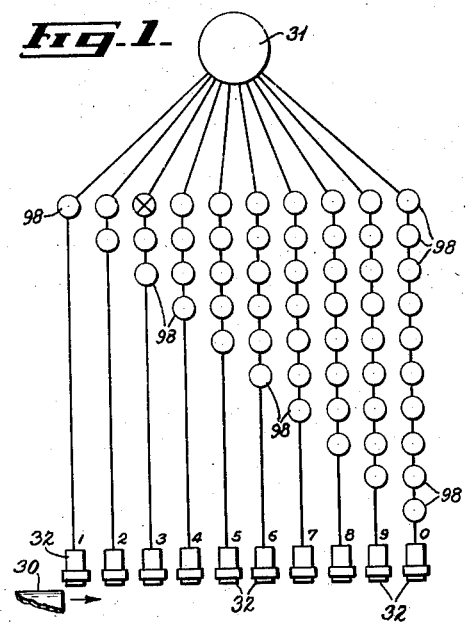
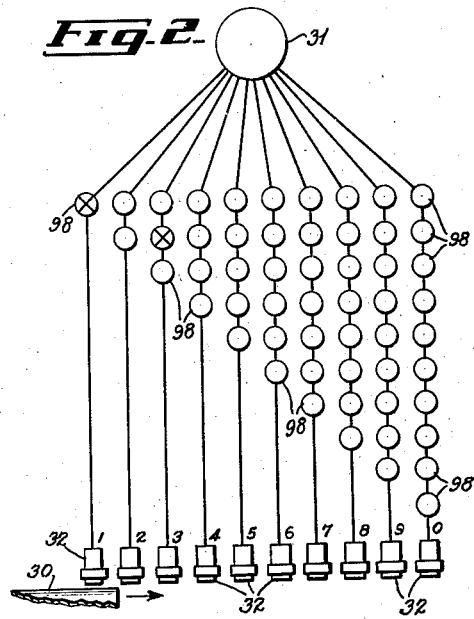
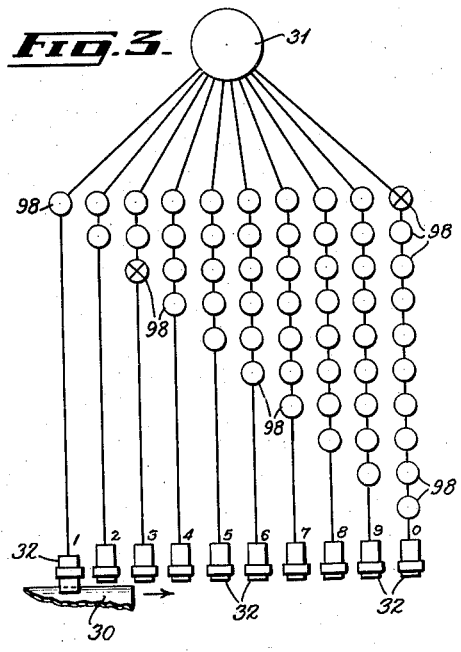
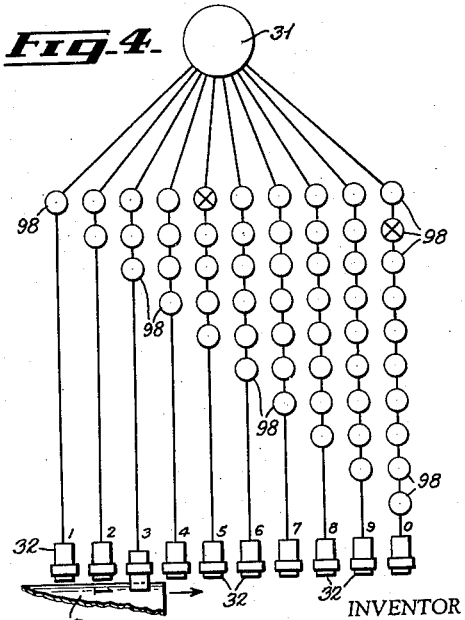
INVENTOR
Robert F. Johnston
BY Stevens, Davis, Miller & Mosher
ATTORNEYS

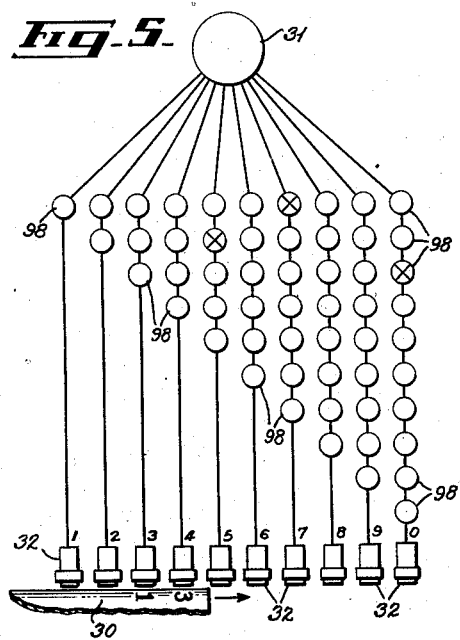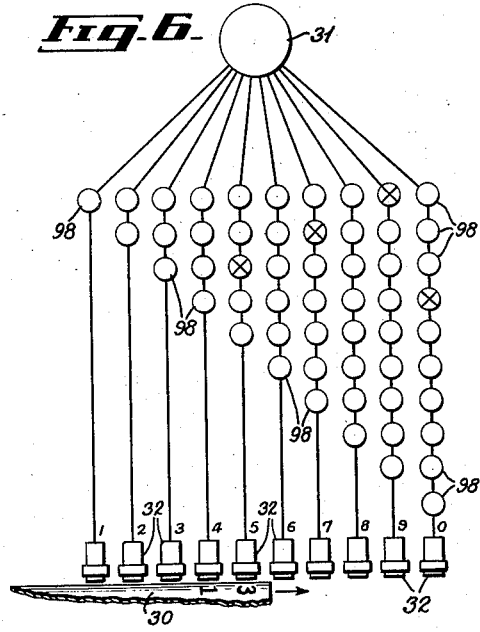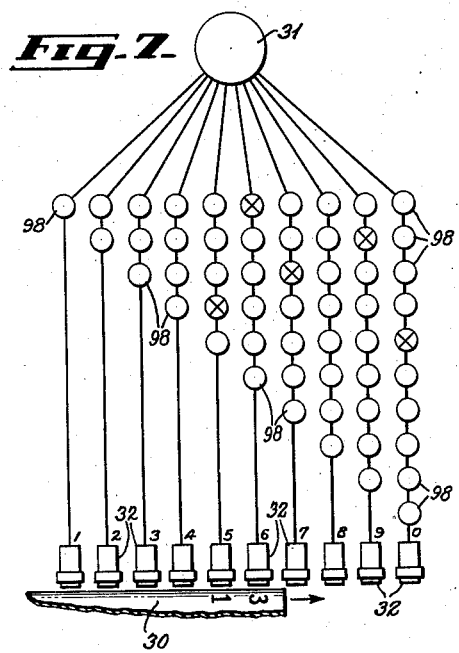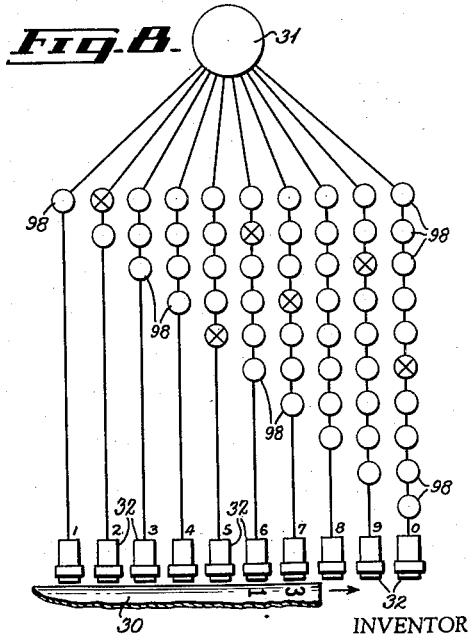
INVENTOR
Robert F. Johnston

Oct. 28, 1958     R. F. JOHNSTON     2,858,536
TYPE ACTUATING MEANS IN HIGH SPEED PRINTERS
Filed May 4, 1955     6 Sheets-Sheet 3
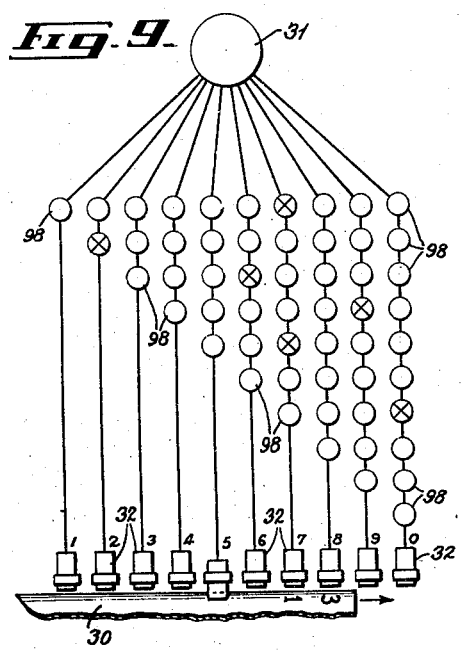
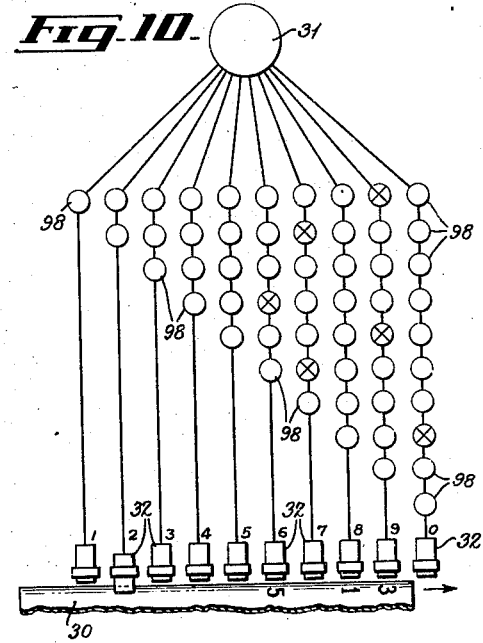
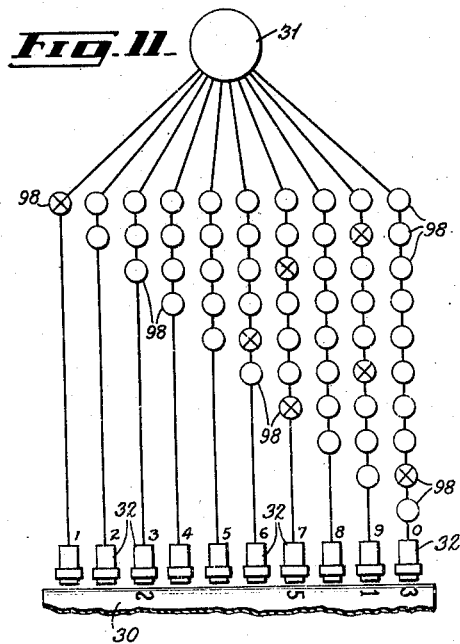
Fig. 12.
| 3 | 4 | 2 | 6 | 8 | 8 | 0 | 6 | 2 | 1 |
|---|---|---|---|---|---|---|---|---|---|
| 1 | 2 | 8 | 9 | 2 | 2 | 6 | 4 | 3 | 0 |
| 0 | 6 | 8 | 9 | 6 | 6 | 6 | 2 | 5 | 7 |
| 5 | 1 | 3 | 7 | 9 | 6 | 9 | 7 | 2 | 4 |
| 7 | 4 | 8 | 7 | 4 | 2 | 1 | 0 | 7 | 6 |
| 9 | 5 | 2 | 0 | 1 | 5 | 6 | 9 | 8 | 4 |
| 6 | 6 | 0 | 3 | 3 | 4 | 9 | 7 | 8 | 1 |
| 2 | 7 | 9 | 4 | 6 | 1 | 3 | 1 | 2 | 8 |
| 7 | 1 | 4 | 2 | 7 | 7 | 2 | 8 | 3 | 9 |
| 9 | 3 | 5 | 8 | 2 | 3 | 8 | 5 | 1 | 0 |
| 1 | 0 | 6 | 0 | 8 | 2 | 9 | 1 | 7 | 5 |
| 4 | 9 | 1 | 5 | 6 | 0 | 6 | 2 | 9 | 7 |
INVENTOR
Robert F. Johnston
BY Stevens, Davis, Miller & Mosher
ATTORNEYS Oct. 28, 1958 R. F. JOHNSTON 2,858,536
TYPE ACTUATING MEANS IN HIGH SPEED PRINTERS
Filed May 4, 1955 6 Sheets-Sheet 4

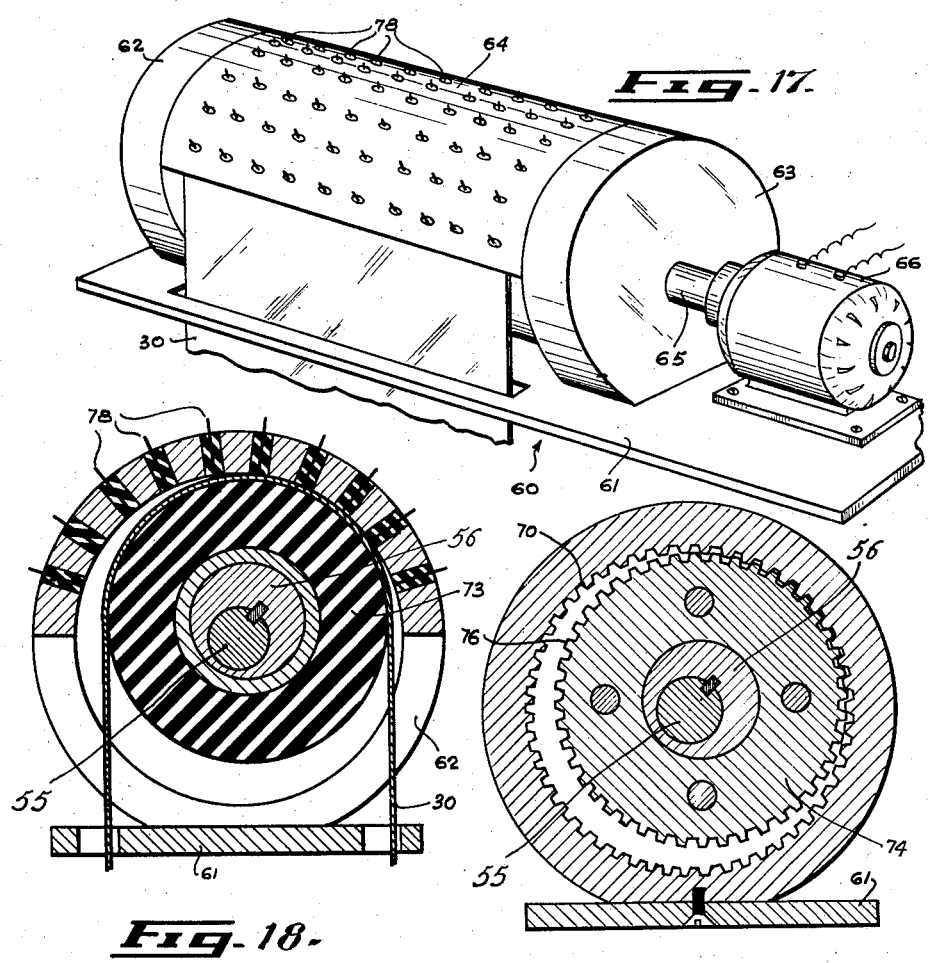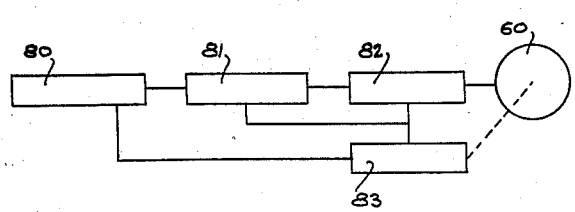

Oct. 28, 1958  R. F. JOHNSTON  2,858,536
TYPE ACTUATING MEANS IN HIGH SPEED PRINTERS
Filed May 4, 1955  6 Sheets-Sheet 6

Inventor
Robert Fraser Johnston
by Stevens, Davis, Miller & Mosher
his attorneys United States Patent Office 2,858,536
Patented Oct. 28, 1958

2,858,536

TYPE ACTUATING MEANS IN HIGH SPEED PRINTERS

Robert Fraser Johnston, Toronto, Ontario, Canada, assignor to National Research Council, Ottawa, Ontario, Canada, a body corporate of Canada Application May 4, 1955, Serial No. 505,985

9 Claims. (Cl. 101—93)

This invention relates to the recording of information by a printing machine.

For simplicity the terms "printing machine"; "printing means"; "printer"; and "printing" will be used throughout this specification, and it is intended that these terms should not be read in any narrow sense of printing with ink or other dye. "Printing," etc., as used herein, is intended to cover all forms of marking a "record sheet" (which is the term employed to designate generically all forms of record receiving sheets, cards, tapes, etc.) whether by ink or dye inscriptions; the making of holes, depressions or elevations; or by the action of electric pulses or electromagnetic radiation on sensitized paper, wire or film, since the actual method of inscription employed is not germane to the inventive advance which is concerned with a novel sequence of steps in the formation of a printed record and with a printer for carrying such novel sequence of steps into effect.

Electronic computers and like data processing devices have now been developed to a stage of high speed operation where it is becoming increasingly less practical for existing printers to keep pace with the speed at which information is delivered to them. An operation that can be performed in a minute fraction of a second by the electronic apparatus is often required to determine the setting of a movable mechanical element in a printer where the inertia of the parts positively precludes operation in anything like so rapid a manner.

In a typical printer for recording intelligence delivered from an electronic computer in the form of a series of numerals, the type face corresponding to the numeral required for each operation is first brought into register with the surface of the record sheet, these parts then being moved together to give rise to an impression on such record sheet. After the parts have been moved apart again, the member carrying the various different type faces required, for example a disc (sometimes drums or bars are used), is moved to a fresh position while the record sheet is advanced, whereupon a second printing operation is performed. Normally this printing disc will form only a part of the printing mechanism, a series of discs being arranged side-by-side so that a number of numerals may be printed simultaneously and in a row on the record sheet each time the printing mechanism and such sheet are moved towards each other. Even with this type of arrangement, it may still be necessary to reset each disc in between each printing operation, and in practice this often cannot be done as quickly as the intelligence can be fed to the printer.

There is thus an urgent need for a printer that can operate at very high speeds; and it is the primary object of the present invention to provide a printer that will fulfill this requirement.

It is believed that the inherent unsuitability of existing printers to satisfy this need can be traced to the constant necessity of setting and resetting a member (such as the discs referred to above) to one of a number of possible positions in order to choose the symbol that is to be printed. This inevitably involves the movement of mechanical parts having inertia.

One merit of the present invention resides in the fact that all such setting is avoided by the provision of a series of individual printing means arranged along the path of travel of the record sheet so that, as the sheet is advanced in relation to such series, any selected area of said sheet is at some time or other in register with each of said printing means. The printing means each carry only a single predetermined type face. Thus, when using a numerical code, ten separate printing means will be required each adapted to print one of the numerals 1, 2, 3, 4, 5, 6, 7, 8, 9 and 0. Each printing means then represents a choice between only two alternatives: to operate or not to operate. This is known as a binary choice, as distinct from the multiple choice presented by the disc type of printing mechanism mentioned above, in which one of ten numerals had to be selected. The printing means themselves which present this binary choice can be of much simpler construction than printing means presenting a multiple choice. The only mechanical movement involved is the actual movement together of the printing means and the record sheet to make the impression, and even this may be avoided if the printing is carried out electrically or optically on a sensitized record sheet.

As explained above, in a printer operating in accordance with the invention, separate printing means are provided for each symbol required to be printed and these printing means are arranged in an elongated series, which may extend in a straight line, or may extend around the periphery of a drum as will become apparent from the description of the preferred embodiment that follows. Relative movement betwee the record sheet and the series of printing means is brought about so as to bring any given selected area of the sheet successively into register with each of the printing means. The printer is arranged so that only the printing means adapted to inscribe the required symbol in such selected area will be actuated when in register with such area. At times when the selected area is in register with other printing means they will be unactuated, although such other printing means will not necessarily be unactuated when the selected printing means are printing in the selected area, because such other printing means may then be in register with another area on which an impression that such latter means are adapted to impart is required.

Thus, as the record sheet passes along the series of printing means, a number of printing operations take place, some simultaneously, some individually. Assuming that one or other of the symbols carried by the various printing means is to be inscribed in each selected area of the record sheet (the selected areas forming a uniformly spaced series) then each such area will be subjected to a printing operation once during its passage along the series of printing means. If the symbol to be inscribed in the leading selected area of the record sheet is carried by printing means disposed at the end of the series of printing means remote from the point of entry of the record sheet, such area will remain unmarked until it reaches such end, in spite of the fact that other more rearward selected areas may already have had symbols impressed on them when they were in register with the particular printing means bearing type face adapted to form the symbols required to be inscribed in said rearward selected areas, since such latter printing means may be disposed near the centre of the series or the end adjacent the point of entry of the record sheet.

It should be understood that the so-called "selected areas" are normally not marked in any way on the record sheet, being "selected" simply by the initial orientation of the record sheet at the beginning of the series of printing means and by the speed or length of step of the forward feed of the record sheet. However, the use of preprinted forms is entirely possible.

A better understanding of the invention is provided in the detailed disclosure of the invention to follow.

Figures 1–11 illustrate diagrammatically the operation of the printer in accordance with the basic principle of the invention;

Figure 12 shows a typical record sheet printed by the printer, the left hand column of numerals corresponding to the numerals being printed in Figures 1–11;

Figure 17 is a diagrammatic perspective view of a practical printer embodying the method of operation demonstrated in Figures 13 to 15;

Figure 18 is a central transverse cross-section of the printer seen in Figure 17;

Figure 19 is an end transverse cross-section of the printer seen in Figure 17;

Figure 20 is a block diagram illustrating the overall operation of a printer as seen in Figures 17 to 19;

Figure 13:
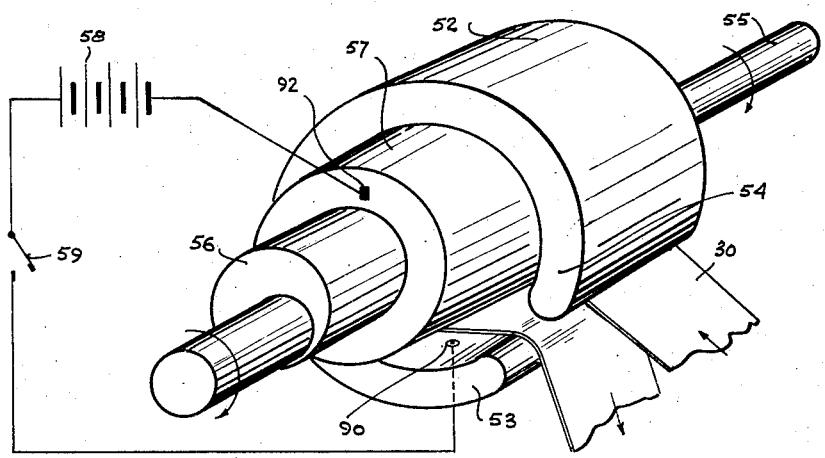
Figure 13 shows a schematic perspective view of a simplified printer operating in accordance with the invention.

To provide a clear understanding of the principle of this invention Figures 1–11 have been provided. In Figures 1–11, ten printing means 32 are provided. The legends "1," "2," "3," etc., each associated with a separate one of the printing means 32 indicate the numeral that the particular printing means will print. The Figures 1–11 are a diagrammatic representation of the principle of the invention of the actual printer shown in Figure 13.

In the preferred embodiment of the printer, the separate printing means 32 will be located around the periphery of a cylindrical shell rather than in a straight line. In Figures 1–11, for convenience only one group of printing means 32 are shown which will print only one column of numerals. In the preferred embodiment of the printing apparatus, several groups of printing means will be arranged next to the group of printing means shown. Each group of printing means will be identical to the first group shown and will print a separate column of numbers adjacent the column printed by the first group so that a printed sheet of several columns of numbers will result as is shown in Figure 12.

The Figures 1–11 show only how the left hand column of numerals in Figure 12 are printed and it will be obvious how the remaining columns of numerals could be printed by additional groups of printing means.

In Figures 1–12 the sheet 30 is to be printed with a column of numerals in the sequence shown in the left hand column of numerals in Figure 12. The Figures 1–12 each represent an instant of time as the sheet 30 moves under the printing means 32. Figure 1 represents a first instant of time when the sheet 30 has not yet entered under the printing means. Figure 2 represents the next instant of time when the space to be printed has entered under the numeral "1" printing means. Figure 3 represents the next instant of time when the sheet 30 has been advanced to where the first space to be printed is under the numeral "2" printing means and the second space to be printed is under the numeral "1" printing means. Likewise Figures 4–11 represent respectively the 4th through the 11th instants of time when the first space to be printed is under the respective printing means as shown. In each figure the sheet 30 has advanced one space from where it is shown in the preceding figure.

Electrically connected to each of the printing means 32 is a shift register. Each shift register is represented by a series of circles 98. Each circle 98 represents one stage of a shift register. The shift register connected to the numeral "1" printing means has only one stage so it is represented by only one circle. The shift register connected to the numeral "2" printing means has two stages so it is represented by two circles. The shift register connected to the numeral "0" printing means has ten stages so it is represented by 10 circles. Each shift register shall henceforth be identified by the printing means to which it is connected. For example the shift register connected to the numeral "1" printing means shall be called the numeral "1" shift register. Whenever an output signal is applied by the shift register to the printing means, the printing means is actuated to print on the sheet 30. When one of the printing means 32 is in the actuated position it will be shown as the numeral "1" printing means in Figure 3. Electrically connected to the shift registers is a decoding unit 31, which receives the information to be printed and supplies the appropriate shift register with information according to the information received. Each of the stages 98 of each shift register is a binary storage unit. That is it has two stable states and when it is one state it has what is called a "bit" stored. When the stage is in the opposite state it has nothing or zero stored. In Figures 1–11 a stage is marked with an X whenever a bit is stored in the stage, as is the top stage of the numeral "3" shift register connected to the numeral "3" printing means in Figure 1. Whenever a shift pulse is applied to the shift register the stored bits are shifted from the stage of the shift register that they are in to the next lower stage. If there is a bit in the lowermost stage of a shift register it is shifted out to actuate the printing means 32 connected thereto. The decoding unit 31 enters information into the appropriate shift register by storing a bit in the uppermost stage of the respective shift register. Each time the sheet 30 is moved forward one space a shift pulse is applied to all of the shift registers to shift the bits down one stage and a bit is entered into the uppermost stage of one of the shift registers.

Figures 1–11 illustrate how this system will print the left hand column of numbers shown in Figure 12. The numeral to be printed in the first space is "3" so when the sheet 30 is moved to the position shown in Figure 1 a bit is entered into the numeral "3" shift register, which is connected to the numeral "3" printing means. When the sheet 30 is moved to the position shown in Figure 2 the bit in the numeral "3" shift register is shifted down one stage. At the same time a bit is entered into the numeral "1" shift register as the numeral to be printed in the second space is "1." When the sheet 30 is moved forward one more space as is shown in Figure 3 a bit is entered into the uppermost stage of the numeral "0" shift register as "0" is to be printed in the third space. At the same time the bit in the numeral "3" shift register is shifted to the next lower stage and the bit in the numeral "1" shift register is shifted out to actuate the numeral "1" printing means, which is shown in its actuated position. The numeral "1" printer therefore prints "1" in the second space which is under the numeral "1" printer at this time. When the sheet 30 moves forward one more space to the next position as is shown, a bit is entered into the numeral "5" shift register as "5" is to be printed in the fourth space. At the same time the bit stored in the numeral "0" shift register is shifted down one stage and the bit stored in the last stage of the numeral "3" shift register is shifted out to actuate the numeral "3" printing means which accordingly is shown in its actuated position. The numeral "3" printing means prints "3" in the first space, which is under this printing means at this time. When the sheet 30 moves forward to the next space as shown in Figure 5 a bit is stored in the numeral "7" shift register as the numeral to be printed in the fifth space is "7." The bits stored in the numeral "5" and the numeral "0" shift registers are shifted to the next lower stage. When the sheet 30 is moved to the next position shown in Figure 6 all of the stored bits are shifted down to the next lower stage and a bit is stored in the first stage of the numeral "9" shift register as the numeral to be printed in the sixth space is "9." This operation continues as the sheet 30 moves forward to the position shown in Figure 8 and then to the position shown in Figure 9 with bits being entered in the numeral "6" shift register and then in the numeral "2" shift register to correspond with numerals six and two to be printed in the seventh and eighth spaces respectively. When the sheet 30 gets to the position shown in Figure 9 the bit is shifted out from the last stage of the numeral "5" shift register to actuate the numeral "5" printing means causing "5" to be printed in the fourth space which is under the numeral "5" printing means at this time. At the same time the stored bits are shifted down and a bit is entered into the numeral "7" shift register. Note that the numeral "7" shift register now has two bits stored therein. When the sheet 30 gets to the next position shown in Figure 10 the numeral "2" printing means is actuated to print "2" in the eighth space which is under the numeral "2" printer at this time. All of the other stored bits are shifted down and a bit is entered into the numeral "9" shift register to correspond with the "9" to be printed in the tenth space. When the sheet 30 gets to the next position shown in Figure 11 all of the bits are shifted down and a bit is stored in the numeral "1" shift register to correspond with "1" to be printed in the eleventh space. The operation will continue in this manner and the entire left hand column of numbers shown in Figure 12 will be printed. When the third space gets under the numeral "0" printer the bit will be shifted out of the last stage of the numeral "0" shift register and cause "0" to be printed in the third space and likewise every space will get printed with the correct number.

From the above example it can be seen that when a space to be printed on sheet 30 gets to the position immediately adjacent to the numeral "1" printer just before moving under the numeral "1" printer a bit is entered into the appropriate shift register. This bit will eventually be shifted out to actuate a printer to print the corresponding number in the above mentioned space.

In the example shown only numbers are being printed but it is obvious that letters or any symbols could be used instead of or in addition to the numbers. The shift registers function as delay means to give an appropriate delay to the actuation of the printing means until the appropriate space is under the printing means. It is clear that other forms of delay means could be used but shift registers are preferred because the delay is thereby easily synchronized with the forward movement of the sheet 30 by applying a shift pulse to the shift register each time the sheet 30 is moved forward one space.

The printing means shown in Figures 1–11 are diagrammatic only and are intended only to illustrate an electrically actuated printing means. The way that the printing means are to be actuated will be fully explained with reference to Figures 8–13.

From the foregoing it will be apparent that the invention may be defined as a printer comprising a series of spaced individually operable printing means each adapted independently to print a single predetermined one of a set of symbols, means for effecting relative movement between the series of printing means and a record sheet in the direction in which said series extends, operation of each of said printing means being effected whenever there is in register with such printing means an area of the record sheet on which there is to be inscribed the symbol said printing means is adapted to print.

It is normally convenient in practice to space the printing means uniformly from one another and to move the record sheet intermittently by steps equal in length to the spacing of the printing means. Stepwise movement of the record sheet is especially convenient when conventional mechanical printing devices are employed in order to avoid smudging or blurring of the inscription. It is not beyond the scope of the invention, however, more especially when methods of printing electrically or optically on sensitized paper are employed, for the record sheet to move continuously beneath the series of printing means (or vice versa—the essential feature being relative movement between the record sheet and the series of printing means, although it will normally be more convenient to fix the printing means and move the record sheet). It will be evident that, with continuous movement of the record sheet at a constant speed, the actual spacing of the printing means will not be critical, since there will be no need to relate the spacing to the length of "steps" taken by the record sheet. The really basic requirement is that the delay imposed by each of the delay mechanisms should correspond to the time taken by any point on the record sheet to travel from the datum position to the printing means connected to such delay mechanism. This time will be a function of the distance of the printing means from the datum position and the mean speed of the record sheet. If the speed is uniform (whether uniformly stepwise or continuous in the sense of being of unvarying speed), then the delay will be a simple proportionate fuction of the distance of the printing means from the datum position.

In practice, a computer will seldom emit just a single digit on each occasion, but will emit a row of digits, say for example ten digits. The type of record desired to be formed on the record sheet 30 will thus be of the nature shown in Figure 12 of the accompanying drawings, in which it will be noted that the lefthand column of numerals are those employed to demonstrate the invention in Figures 1 to 11. The printing of the other nine columns will proceed similarly and substantially simultaneously to the printing of the first column and no further detailed description will be furnished, although the apparatus to be described later illustrates how this requirement may be met in practice.

A particularly satisfactory method of advancing a record sheet in a printer, which may be used for putting the foregoing principle into practice, is embodied in apparatus operating as illustrated diagrammatically in Figures 13 to 20 of the accompanying drawings.

Figure 14:
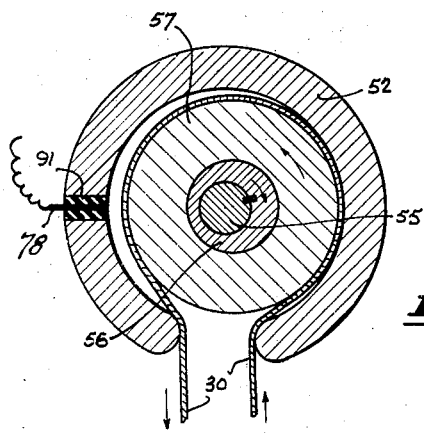
Figure 14 shows a central transverse cross-section of the printer seen in Figure 13.
Figure 15:
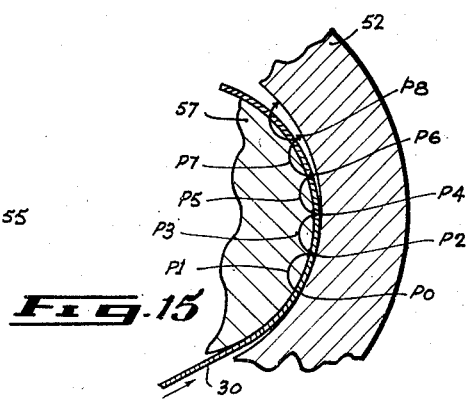
Figure 15 shows an enlarged fragment of the section seen in Figure 14, illustrating the movement of the parts.

In Figure 13, a printer has been illustrated employing only a single printing means 78, the primary purpose of this figure, and Figures 14 and 15 which show details thereof, being to describe the preferred method of advancing the record sheet 30. The printer seen in Figures 13, 14 and 15 comprises an open-ended cylindrical shell 52 having a longitudinally extending slit defined by edges 53 and 54. A shaft 55 extends centrally along the shell 52 and is supported between suitable bearings (not shown) externally of the shell. Rigidly mounted on the shaft 55 is an eccentric 56 having a cylindrical outer surface which fits snuggly within a cylindrical bore of a roller 57 mounted within the cylindrical space defined by the shell 52. The roller 57 which is free to turn on the eccentric 56 is of somewhat lesser external diameter than the internal diameter of the shell 52, the eccentricity of the eccentric 56 being such as to cause a portion of the periphery of the roller 57 to bear against a portion of the interior of the shell 52 with space for the record sheet 30 pressed firmly therebetween, while a gap of varying size will exist between these two cylindrical surfaces in other parts of the shell. The roller 57 will thus roll smoothly over the inner surface of the shell 52, when the shaft 55 is rotated and thus will have the effect of advancing the record sheet 30 through the printer. If the shaft 55 turns clockwise, the roller 57 will turn slowly anti-clockwise relatively to the shell 52 and the sheet 30 will travel anti-clockwise, i. e. in the direction of the arrows shown in Figure 14. Each time the shaft 55 makes a complete revolution, the record sheet 30 is advanced by an amount equal to the difference in circumference of the exterior of the roller 57 and the interior of the shell 52. As the record sheet 30 is moved forward, a given point thereon will move in a hypocycloidal path contacting successively a series of points disposed around the inner periphery of the shell 52, and remaining briefly at rest at each of these points, at which time it is intended that the printed inscription will be recorded on the record sheet. This operation is illustrated in Figure 15 in which the positions P0, P1, P2, P3, P4, P5, P6, P7, P8 represent the progress of a single point on the record sheet 30 during four successive revolutions of the shaft 55. It will be evident that the record sheet 30 does not move abruptly, but commences to move very gradually when in contact with the shell 52, e. g. from point P0, accelerates to a maximum velocity when out of contact with the shell 52 (at point P1), and then decelerates to zero velocity again (at point P2) when again in contact with the shell 52. Any tendency to tear the paper or other material of which the record sheet is formed, is thus greatly reduced, and this is of considerable advantage in enabling higher speeds of operation to be achieved.

Figures 13 and 14 show diagrammatically a simple form of printing means in which a current from one pole of an electric battery 58 is fed through a controlling switch 59 to the printing means 78 mounted in an insulating bushing 91 in the shell 52, the other pole of the battery 58 being connected to the roller 57 by means of a wiping contact 92. The record sheet 30 is rendered electrosensitive so that each time an area thereon is pressed by the roller 57 against an energized printing means 78, a suitable mark is recorded on the paper, the shape of the mark being determined by the nature of the contact.

Figure 16:
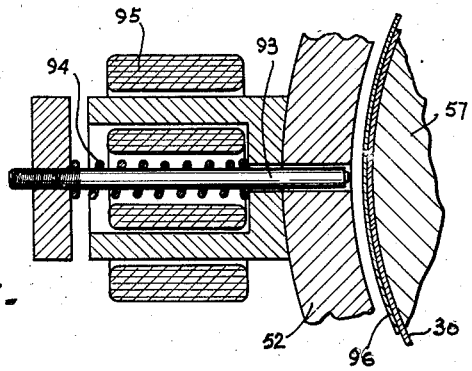
Figure 16 is a fragment of a printer similar to that seen in Figures 13 to 15, illustrating an alternative form of printing means.

Figure 16 demonstrates an alternative, mechanical form of printing means, consisting of a type-carrying bar 93 normally urged away from contact with the record sheet 30 by means of a spring 94 but arranged to be movable towards such record sheet by a solenoid 95. An inking ribbon 96 is shown as extending over the face of the record sheet 30 upon which the inscription is to be made. At this point it may be mentioned that if desired a plurality of such inking ribbons could be used to provide the printing of characters in different colours. Such ribbons may either extend from one roll to another in the manner of a typewriter, or endless ribbons could be used. Alternatively strips of carbon paper could be employed, a treated paper of the so-called carbonless carbon paper type could be used, or the roller could be continuously inked by a second roller running in an ink reservoir. In this latter instance, the paper would be preferably provided with a waxed or greasy surface so that the ink would only penetrate the paper when the surface was broken by a type-carrying printing means.

It will thus be seen that a further aspect of the invention is the provision in a printer of a mechanism for advancing a flexible record sheet, said mechanism comprising a shell having a concave partially cylindrical surface with at least one printing means arranged therein, a cylindrical roller of lesser external diameter than twice the radius of curvature of said concave surface, means for causing the central longitudinal axis of said roller to describe an orbit about a longitudinal axis displaced from and parallel to said central longitudinal axis and for causing the roller itself to rotate about said central longitudinal axis with its outer surface in rolling contact with said concave surface, continuous movement of said roller effecting stepwise advancement of a record sheet interposed between said surfaces to bring successive areas thereof into printing relationship with said printing means.

A printer incorporating the methods of operation illustrated in Figures 1 to 12 and in Figures 13, 14 and 15, is seen in Figures 17, 18 and 19.

The apparatus shown in these latter figures is denoted generally by the numeral 60. It consists of a base 61; end-supporting members 62 and 63 between which there extends a semi-cylindrical plate 64, corresponding in function to the previously described shell 52; the shaft 55 driven by a motor 66; the eccentric 56; and a rubber roller 73 which is mounted on said eccentric to co-operate with the inner periphery of the plate 64 in a manner similar to that described with reference to Figures 13, 14 and 15. The end members 62 and 63 are each formed as internal gears with inwardly directed teeth 70 (see Figure 19) which co-operate with teeth 76 of spur wheels 74 secured to each end of the roller 73. The use of these teeth, which should be as small and numerous as convenient to reduce backlash and interference, avoids reliance on friction to ensure correct rolling of the roller 73.

A hundred separate printing means 78 are shown in Figure 12. These printing means as illustrated are the same kind as the electrosensitive type described with respect to Figures 8 and 9. It is understood that other types of printing means such as is shown in Figure 11 could be used instead. These printing means are disposed around the periphery of the plate 64 in ten columns extending longitudinally of the plate 64 in ten rows. This arrangement of a hundred printing means will be adapted to produce a record of the type illustrated in Figure 12 across which a number of rows, each consisting of ten digits, is to be formed. The number of rows is not, of course, restricted in any way, as each column can extend indefinitely, limited only by the length of the record sheet.

It will be apparent that the printer 60 will cause a row of "selected areas" of the record sheet 30 to advance stepwise from row to row of the printing means 78 in the manner illustrated in Figure 10. The printing means 78 in any one row will operate simultaneously, if actuated; but it should be understood that, although successive rows of areas on the record sheet are brought into printing relationship intermittently with any one row of printing means 78, and that this operation is taking place during the same period in respect of each row of printing means 78, each row of printing means will be in printing relationship with the record sheet a short time after the preceding row of printing means was in such printing relationship. In other words, there is no single stepwise movement of the record sheet as a whole in relation to the whole of a series, i. e. column, of printing means, but a number of mutually slightly out-of-phase stepwise movements of the record sheet between each pair of adjacent printing means of such series. This could be loosely compared to the passage of a wave or ripple along the record sheet.

If the mechanical printing means, such as is shown in Figure 16, is used it can be actuated in either of two ways:

Method (a)

Just prior to the moment when the roller has moved the record sheet as close as possible to the type face, a pulse of current can be applied to the solenoid by circuitry to be described later. The solenoid will then magnetically drive the type carrying bar toward the record sheet, and will "bounce" the bar against the inking ribbon, record sheet and roller at the exact moment when these are located at the particular cusp or point of the hypocycloidal path associated with this particular printing means (P0, P2, P4, P6 or P8, etc.). Thus an impact-type impression, similar to that made by an ordinary typewriter type bar, will be made on the record sheet.

It should be noted that this method of operating the printing means requires comparatively precise timing of the current pulses applied to the solenoid, so that comparatively complicated circuitry is required, as will be explained later. Also, virtually all the energy involved in the actual operation of printing is supplied by the current pulse. Therefore, if the amplitude of the current pulses is to be kept reasonably small, the type bars must move a considerable distance in order to attain sufficient kinetic energy to produce a sharp impression.

With this first method of impulsing the type bars to produce impact-type printing, the present invention has one important advantage over other printers. The cusp points P0, P2, P4, P6, P8, etc. of Figure 10, mark the positions occupied by the record sheet at the moment when the type bar is to contact the record sheet and printing is to take place. It is evident from Figure 10 that for some time before and after these moments, when areas on the record sheet are positioned exactly at those cusp points, the motion of these areas is substantially radial, with virtually no circumferental component of motion. Therefore, if the time of impact of the type bar is slightly inaccurate, and the type strikes the record sheet slightly earlier or slightly later than it should, the printed character will still appear at almost exactly the right position on the record sheet. This provides certain tolerance on the timing of the current pulses, and on the adjustment of the distance of travel of the type-carrying bar, without appreciable mispositioning of printed symbols, and this constitutes an important advantage of the present invention.

*Method (b)*

Some time prior to the moment when the roller moves the record sheet as close as possible to the type face, a steady current can be applied to the solenoid. The type-carrying bar will then be moved inward magnetically, and held there either magnetically, while the roller rolls over and beyond the bar, pressing the record sheet against the type-bar in passing. The steady current can then be removed if it is not required that this type-bar shall print during the succeeding revolution; the type-bar will then be moved outward by spring 94 so that during the next revolution this type-bar will not engage the record sheet. As has been noted above, in the vicinity of the cusp points P0, P2, P4, P6, P8, etc. of Figure 10, which are the regions where type-bars come in contact with the record sheet, the motion of the record sheet is substantially radial, so that there is virtually no circumferential component in the motion of the record sheet with respect to the type face while these are in contact, and the symbols so printed will not be smeared.

With this second method of operating the type-bars, the exact moment of printing becomes unimportant, and a much wider tolerance is allowed in respect of the times of starting and stopping the solenoid-actuating current. The current for actuating a particular printing means during a particular revolution of the shaft may start any time after the roller has passed such printing means during the previous revolution. It must start a sufficient time before the roller approaches such printing means during the particular revolution in which it is to print, for the printing means to be positioned before the record sheet is brought into contact with it. For example, a convenient datum point (say one step before the first row of printing means) may be chosen. Each time the roller passes this datum point, all the printing means which are to print during the next revolution can be set simultaneously. Each selected printing means will then actually print when the roller rolls against it during the next revolution. Alternatively, all printing means may be set sequentially rather than simultaneously, beginning when the roller reaches some convenient datum point. The time taken for this sequential setting of all printing means is not critical; it is only necessary that all printing means in the first row required to print be completely set by the time the roller rolls over the first row, that all printing means in the second row required to print be completely set by the time the roller rolls over the second row, and so on.

Alternatively, no single datum points need be chosen, setting of the required printing means in each row taking place independently and beginning as soon as the roller has rolled a certain distance (for example, one row) past each row during the previous revolution. Since the setting of the printing means in a certain row need not be completed until the central shaft has progressed through almost a complete revolution, and the roller is again about to roll over this row, it will be understood that this second method allows a maximum (and equal) tolerance in the moment for setting the printing means in each row, and that the time taken to effect such setting may be of the order of 90% of the time for a full revolution of the central shaft. This method can thus be used to obtain very high speeds of operation of the printer even though comparatively slow-setting printing means are used.

The wide timing tolerances available with this second method of operating the printing means greatly simplifies synchronization problems, and leaves a wide choice of simple methods and apparatus for buffering between a computer and the printer, as will be shown later. Furthermore, the amplitude of solenoid current can be quite small, since the energy supplied by this current is required only to position the type-bar well before it contacts the record sheet, and to hold it in this printing position. This allows the solenoids to be smaller and of simple construction. Furthermore, the distance which the type-bar must move between the non-printing and the printing settings is determined only by such factors as the compressibility of the record sheet and the printing pressure required, and can probably be as little as .005", with standard commercial papers and carbon papers. Furthermore, if the type-bar is latched in the printing setting, virtually all of the energy involved in the actual operation of printing is supplied by the motor driving the central shaft, and the inertia of shaft and roller, and not by the current applied to the solenoid. Furthermore, this method of printing by rolling action, as compared with impact action is quieter, produces less wear on type faces and type-bars, and gives more uniform impressions.

Either method (a) or (b) for operating the type-carrying bars can be used in this invention, and this invention has considerable advantages with both. However, method (b) is considered a much preferred method and one important merit of the invention is that the motion of the record strip produced by a printer such as illustrated in Figures 13 to 19 is ideally and uniquely suited to the use of method (b).

The type of printing means shown in Figures 13 and 16 are only to illustrate specific embodiments. Other kinds of printing means such as optical printing means or the conventional latching type printing means could be adapted for use in this invention by a person with ordinary skill in the art and the invention is not intended to be limited to the printing means shown.

It will thus be seen that an important feature of the invention is the arrangement whereby the mechanism for advancing the record sheet simultaneously serves to roll the record sheet against pre-set stationary type faces, if these are in the printing position, in a particularly advantageous way, and also serves to move the record sheet away from the type faces again while the record sheet is being advanced, so that a large proportion of a printing cycle is made available for setting of the type faces to print during the next cycle.

It will be seen that in the printer of Figures 17–19 the paper advances by one line for each revolution of the shaft, and ten revolutions are required to carry any one line through the printer. In particular ten revolutions are required to carry the last line in any block of printing through the printer. Thus, if $n$ lines are to be printed, $n+10$ revolutions are required before the printer block has been completed and has emerged from the printer.

Referring to Figure 20, the relationship of the printer 60 to the other parts necessary to use the printer 60 with a computer, are shown. In Figure 20, the printer 60 receives the output of an electronic computer, here denoted by 80 through an output decoder 81 and an output storage, denoted by 82. A control device is shown at 83.

The purpose of the elements just referred to will now be described. An electronic computer in many cases delivers its information as binary numbers and if these are to be printed in decimal digits, the decoder 81 is necessary. If a computer delivering information as decimal digits were used, decoder 81 could of course be omitted. Since a line of information delivered from computer 80 substantially simultaneously, is not printed simultaneously, but may require as many as ten revolutions of the shaft 65 of the printer 60, a storage device such as output storage 82 is required which should be capable of storing information for ten revolutions. The printer 60 prints certain information during each revolution, and this information must be fed from the computer 80 to the printer 60 at discrete intervals, and properly in phase with the revolutions of the shaft 65 of printer 60. The decoder 81 and storage 82 must also be actuated at proper intervals, and in phase with printer 60 as well. Accordingly the control 83 is provided, actuated by printer 60, and connected to computer 80, decoder 81 and storage 82, said control 83 providing pulses for controlling the flow of information to the printer 60.

Figure 21:
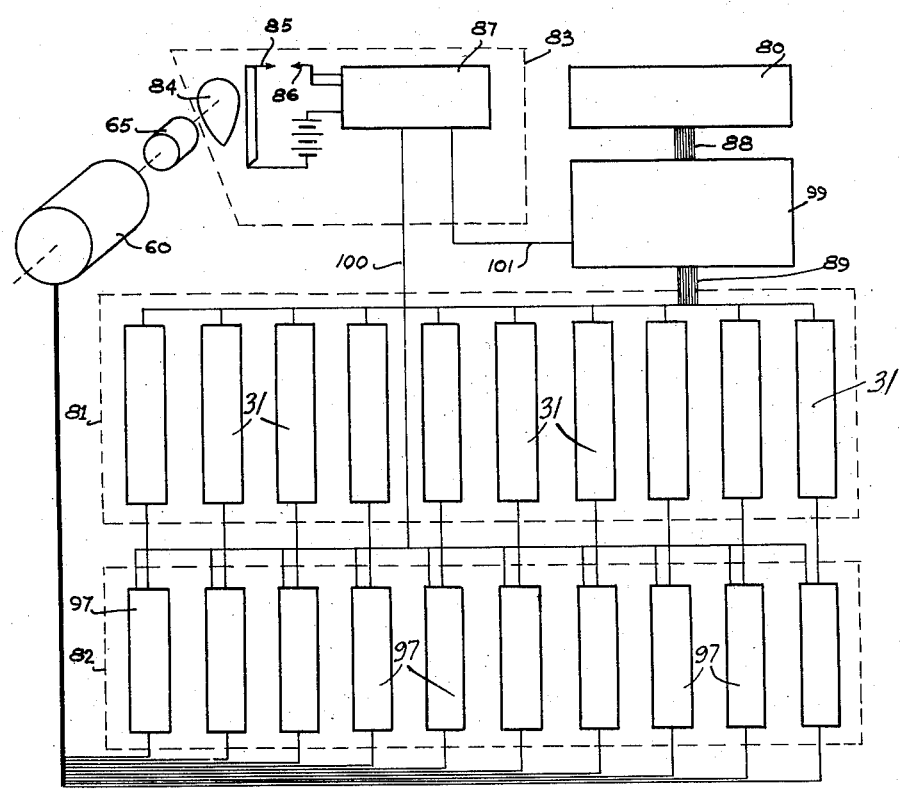
Figure 21 is a further block diagram serving to show more detail of the parts in Figure 20.
Figure 22:
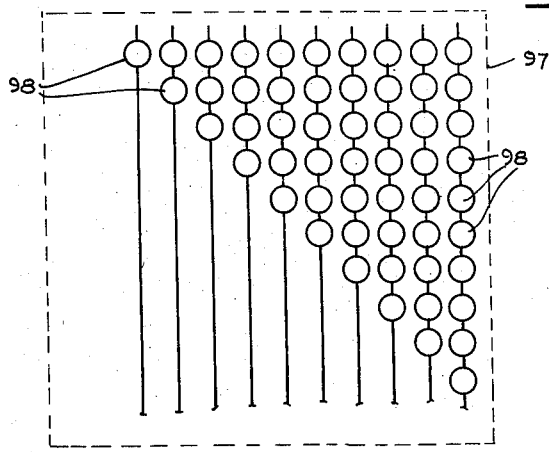
Figure 22 shows more detail of one of the storage elements seen in Figure 21.

Figures 21 and 22 illustrate the preferred way in which the elements of Figure 15 can be constructed. It is assumed that computer 80 has a ten decimal-digit output which appears on forty wires indicated generally at 88. At a certain point during each revolution of the shaft 65 of the printer 60, a cam 84, attached to the shaft 65, causes a pair of contacts 85 and 86 to close (and later open). The closing of these contacts causes a pulse generator 87 to generate a sequence of two pulses: a shift pulse, followed by a gate pulse. (The gate pulse can occur a fixed time after the shift pulse, as determined by an electronic delay circuit or otherwise, or it can be generated by the opening of contacts 85 and 86 as the cam 84 rotates, or by an additional cam and contacts.)

The storage units 97 each comprise a group of shift registers as is shown in Figure 22 and as was explained with reference to Figures 1–11. These groups of shift registers operate in the same way as the groups of shift registers shown in Figures 1–11 and perform the same function. Accordingly the bottom stage of each shift register of each group is connected to a printing means in the printer 60.

The shift pulse provided by the pulse generator 87 is applied through connection 100 to all shift registers of each storage unit 97, causing all the bits stored to advance downward one row of stages, and generally shifting the stored bits out of the bottommost stages of some of the registers. It is evident that if the topmost stage in a shift register with $n$ stages is set to store a bit, the corresponding printing means will be actuated during the $n$th succeeding revolution of the shaft 65. Accordingly, each storage unit 97 is associated with one series of printing means disposed circumferentially around the printer 60 as is shown in Figures 17 and 18. The bottommost stage 98 in the first shift register of all storage units 97 (the shift register containing one element only) is connected to the first printing means in the corresponding series; the bottommost stages 98 in all second shift registers are connected to the second printing means in each series; and so on.

The gate pulse generated by the pulse generator 87 is applied through connection 101 to a computer output gate 99. This connects the computer output register 80 to the decoder 81 which comprises 10 decoding units 31. The output gate 99 connects the output register 80 to each of the decoding units 31 by means of four wires to each decoding unit, these wires being indicated generally at 89. The function of each decoding unit 31 is to determine in which of the ten topmost stages in its storage unit 97 is to be stored a bit when the next shift pulse occurs.

The end of the gate pulse can then signal the computer 80 to place new information in its output register before the next gate pulse begins, or to stop the printer shaft (by means not shown).

It is evident that this arrangement serves to take information from the computer, and cause the actuation of the correct printing means at a later time, during the revolution when the correct area on the record sheet comes into printing relationship with this printing means. It is also evident that the printer operates correctly at any speed of rotation of the shaft 65.

This simple arrangement is sufficient if method (b) above is used to actuate mechanical printing means, or when printing by passing currents through electrosensitive paper.

If method (a) is used, however, the solenoid-actuating current pulse must be applied not only during the correct revolution, but at a certain precise moment within that revolution, as determined by the position of the printing means in the series. This can be accomplished by providing an appropriate further delay between the bottommost element 98 in each column of storage units 97 and its printing means. Alternatively, and preferably, gates can be used instead of delays between each bottommost element 98 and its printing means. These gates can be operated by a sequence of pulses, generated by the pulse generator 87 after the shift pulse. The first pulse of this series will be applied to the gates connecting the first shift register of all storage units 97 to their printing means; the second pulse to all second shift registers; and so on. Each printing means will then actuate at the instant that a pulse is applied to its gate, providing its corresponding bottommost storage has a bit stored.

Alternatively, this sequence of pulses can be applied to the storage units 97 as shift pulses in place of the previous shift pulse: the first pulse is applied as a shift pulse to all first shift registers; the second pulse to all second shift registers, and so on. All printing means are then arranged to be actuated momentarily when and only when the corresponding bottommost storage stage changes from the 0 state to the 1 state.

With either of these latter methods of utilizing a sequence of pulses to mark the instant for actuating the printing means when operating under method (a), the time sequence could be produced by providing fixed time delays in the pulse generator 87 independently of the position of the shaft 65, but this requires that shaft 65 always rotates at one uniform speed. It is preferable to have each pulse related to the position of the shaft 65, for example by providing a multiplicity of cams such as 84 and associated contacts such as 85 and 86, or by a commutator, so that the printer can operate at various speeds of rotation of shaft 65.

It may be convenient to determine the speed of rotation of the shaft 65 in accordance with the rate at which information is emitted by the computer 80. The computer would then include means controlling the motor 66 in order to hold the printer 60 in correspondence with the rate of output of intelligence from the computer.

It will be understood that while it is possible to use method (a) above for actuating the printing means, the use of method (b) for this purpose leads to much simpler circuitry, and that the ability of this invention to utilize method (b) is considered an important advantage.

The above description must be considered by way of illustration and not of limitation, for there are many other ways in which the decoding, storage and control functions can be carried out. The exact structure of the decoder, storage and control mechanisms forms no part of the present invention.

Although the use of a number of columns of printing means to form rows of symbols extending across the record sheet transversely to its direction of travel, involves the mere duplication of the basic elements described in Figures 1 to 11, as far as the construction of the printer is concerned, it is stressed that the ability afforded by the present invention to make this duplication realizes an important advantage of the invention.

In a printer operating in accordance with this invention, it is evident that the printing means may be very much simpler and faster operating than in other printers so that much higher speed of printing can be realized. In other printers, each printing means is capable of producing in a certain area on the record sheet in a printing cycle (defined as the reciprocal of the number of lines printed per second) any one of a large number of different characters. This requires that a selection of one out of many possibilities be made during each printing cycle; the mechanization of such a complex selection requires generally quite complex mechanisms, or simple mechanisms with very precise timing for the selection, and such a complex selection generally takes such a long time that it becomes the feature limiting the maximum speed of printing. In the present invention, each printing means is capable of printing only one character; no mechanical selection is required of which character of the plurality is to be printed, and, when method (b) is adopted, virtually the whole printing cycle is available for effecting the simple positioning of the type-carrying bars either to the print or the non-print settings (which is the nearest equivalent in this invention to the complex selection of symbols in other printers). Consequently, the printing cycle can be much shorter, and the number of lines per second which such a printer can print can be much greater. It is believed that with some designs the positioning of the type-carrying bars can be carried out in as little as two milliseconds, so that the device has a potential operating speed approaching 500 lines per second. It is expected that the practical speed at which the record sheet can be fed will then become the limiting factor and may restrict the maximum speed to a somewhat smaller value.

During the foregoing description, the word "actuate" has been used at different times to refer both to the type of actuation effected in method (a), i. e. actuation to effect an instantaneous printing operation, and also to the kind of presetting actuation required for method (b). This practice will be continued in the claims, where the words "operate" and "operation" with reference to the printing means, will be employed to refer generically to the effecting of a printing operation. Thus: "actuate" means to move mechanically (or otherwise energize when the printing is effected other than mechanically) the printing means, whether to perform a printing operation instantaneously, or whether to pre-set the printing means in readiness for a subsequent printing operation; "set" means to actuate the printing means to bring it to a state of readiness for a subsequent printing operation; and "operate" means to effect a printing operation, whether by actuation of the printing means when the required area on the record sheet is substantially in register with such printing means, or whether by the effecting of relative movement between the printing means and the record sheet to bring such area into register with the printing means after the printing means has been "set."

Furthermore, the expression "delay mechanism" has been used in the foregoing description in describing means employed to postpone the actuation of a given printing means for a given period of time after the emission of the corresponding signal from the computer. It should be understood that this mechanism inherently involves some form of storage means, such, for example, as described in connection with Figure 22. While in the preferred embodiment of the invention the actual time delay is determined mechanically by the shaft speed, it is equally possible to determine this delay by non-mechanical, notably electronic, means. For this reason, the apparatus provided for determining the time delays and for storing the actuating signals during such time delays, will be referred to in the claims by the comprehensive and generic expression "delay device."

This application is a continuation-in-part of application Serial No. 429,647 filed May 13, 1954, now abandoned.

I claim:

1. In a printer, a mechanism for advancing a flexible record sheet, said mechanism comprising a shell having a concave partially cylindrical surface with at least one printing means arranged therein, a cylindrical roller of lesser external diameter than twice the radius of curvature of said concave surface, means for causing relative movement between said roller and said shell such that relatively to said shell the central longitudinal axis of said roller describes a circular orbit about the longitudinal axis of said concave surface while said roller itself rotates about its central longitudinal axis with its outer surface in rolling contact with said concave surface, continuous orbital movement of said roller effecting stepwise advancement of a record sheet interposed between said surfaces to bring successive areas thereof into printing relationship with said printing means.

2. A printer as claimed in claim 1, having a uniformly spaced series of printing means extending circumferentially around said shell, the ratio of said diameter to twice the radius of curvature of the concave surface being such as to effect movement of the record sheet in steps equal in length to the spacing of said printing means.

3. A printer as claimed in claim 2, having at least one further series of printing means disposed in side-by-side relationship with the first such series.

4. A printer as claimed in claim 1, wherein said orbital movement is produced by means of an eccentric mounted on a shaft coaxial with said concave surface, said roller being snugly freely rotatably carried on said eccentric.

5. A printer as claimed in claim 1, wherein said rolling contact is ensured by means of an internally toothed gear secured to said shell coaxially with the concave surface thereof and an externally toothed gear secured to said roller and arranged in mesh with said internally toothed gear.

6. A printer as claimed in claim 2, including a source of information for emitting a sequence of signals indicative of a sequence of symbols to be printed by each series of printing means on the record sheet, and delay devices interposed one between each of the individual printing means of each said series and said source, said devices each being adapted to impose a delay on the actuation of the printing means associated with such device, the length of each delay being determined by the distance of such associated printing means along the series from an initial datum position and by the frequency of the advancing steps of the record sheet, and the moment of commencement of each delay being determined by the moment of register of said datum position and an area of the record sheet on which it is required to inscribe the symbol that such associated printing means is adapted to print.

7. A printer as claimed in claim 6, including means for positively synchronizing the orbital movement of the roller with emission of signals by said source and with the length of the delays furnished by the delay devices.

8. A method of printing on a record sheet a column of symbols corresponding to a sequence of signals by means of a series of uniformly spaced printing means each so constructed and arranged as to print a single predetermined one of a set of symbols and each actuable entirely independently of the state of actuation of all others of said series: said method comprising sequentially emitting said signals one per unit time; transmitting said emitted signals individually each to the selected printing means constructed to print the symbol corresponding to said signal whereby to actuate each said selected printing means to set it in a state of readiness for a printing operation; interposing in each said transmission a delay proportional to said unit time and to the numerical position of said selected printing means from one end of said series; and effecting one printing cycle per unit time, each such printing cycle comprising advancing said record sheet along said series in the direction in which said series extends from said one end thereof to the other end thereof in a continuous undulating motion as to bring momentarily into printing relationship with each one of said printing means, once and only once during each printing cycle, a respective one of a column of areas on said record sheet, each said area coming into such printing relationship with each successive printing means during succeeding printing cycles, and so timing said advancement in relation to said emitting, transmitting and delaying steps as to effect actuation of each selected printing means during an interval between the momentary occasions when successive said areas on said record sheet are in printing relationship with such selected printing means whereby to set such selected printing means in a state of readiness to effect a subsequent printing operation on the next momentary occasion when a said area is brought into printing relationship with such selected printing means.

9. A method according to claim 8, said advancement being further characterized in that during each printing cycle each said area is brought into printing relationship with the associated one of said printing means sequentially along said series.

References Cited in the file of this patent

UNITED STATES PATENTS

| | | |
|---|---|---|
| 679,627 | Leavy | July 30, 1901 |
| 1,506,242 | Keller | Aug. 26, 1924 |
| 1,753,961 | Zworykin | Apr. 8, 1930 |
| 2,575,017 | Hunt | Nov. 13, 1951 |
| 2,686,470 | Gore | Aug. 17, 1954 |
| 2,692,551 | Potter | Oct. 26, 1954 |
| 2,715,360 | Brown | Aug. 16, 1955 |
| 2,762,297 | Baer | Sept. 11, 1956 |
| 2,776,618 | Hartley | Jan. 8, 1957 |
| 2,805,620 | Rosen | Sept. 10, 1957 |
| 2,811,102 | Devol | Oct. 29, 1957 |